Jan. 19, 1960 K. PARR 2,921,597
VACUUM CONTROL APPARATUS
Filed April 2, 1956 2 Sheets-Sheet 1
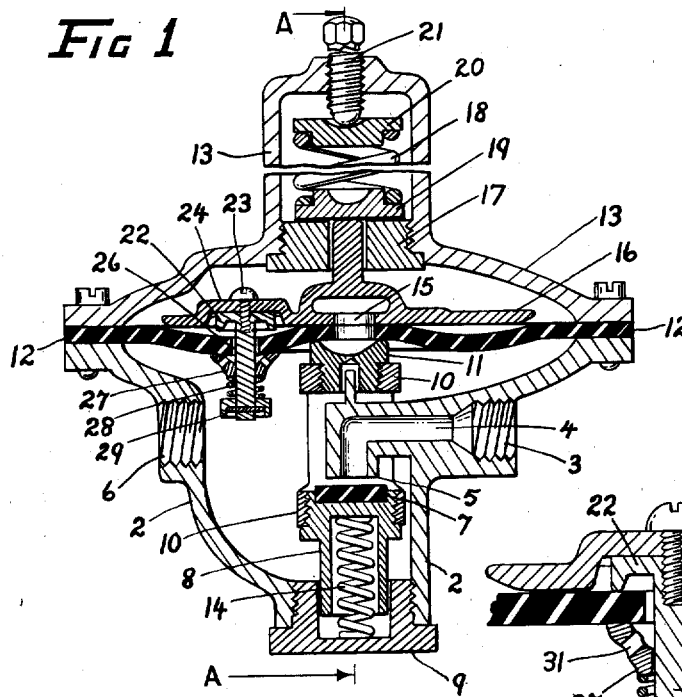
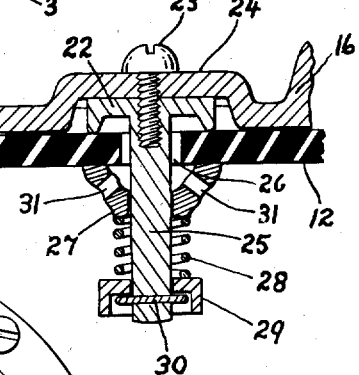
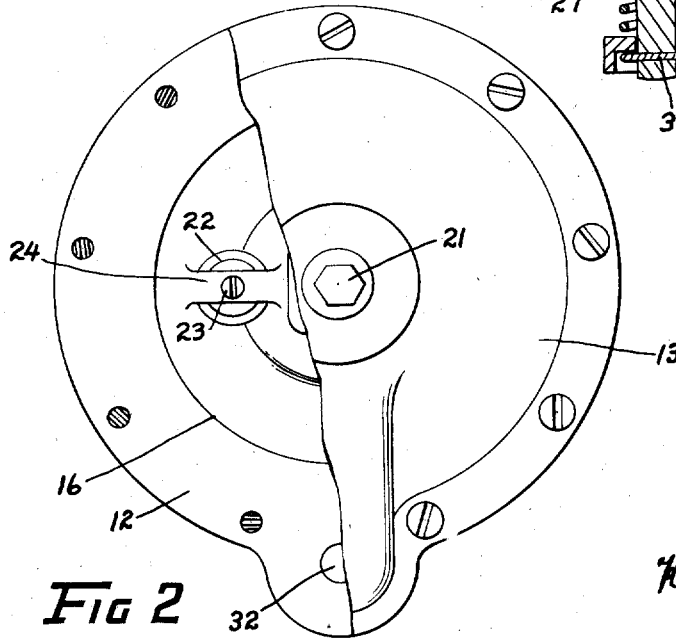
Keith Parr
INVENTOR

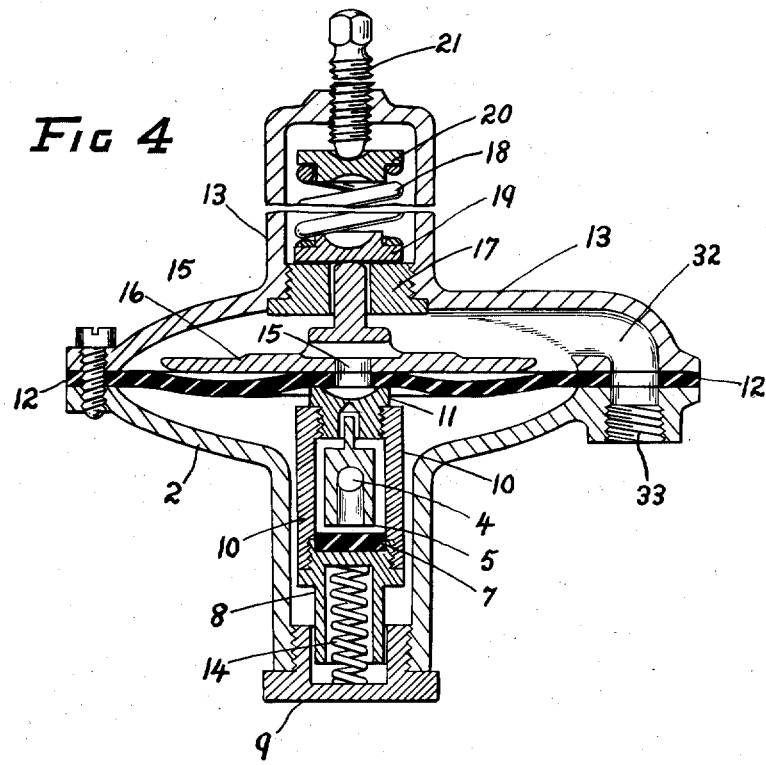
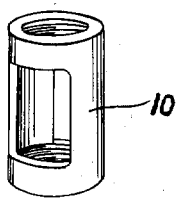

United States Patent Office 2,921,597
Patented Jan. 19, 1960

2,921,597

VACUUM CONTROL APPARATUS

Keith Parr, Melbourne, Victoria, Australia

Application April 2, 1956, Serial No. 575,647

Claims priority, application Australia April 12, 1955

6 Claims. (Cl. 137—116.5)

This invention relates to the class of apparatus used to control or relieve the vacuum which sometimes occurs or sets in in pressure containers when the pressure supply to the container is cut off.

It particularly concerns the class of vacuum controlling or relieving apparatus associated or used in conjunction with a pressure reducing or governing valve which may be used to control the pressure supply of air, water or other gas or liquid to a pressure container.

In apparatus of this class at present known there is usually provided a vacuum relieving device comprising a spring loaded poppet valve which is adapted to be moved against its controlling spring by suction of the vacuum so that the valve port is opened to relieve the vacuum.

However, in some pressure containers such as pressurised domestic hot water storage tanks or the like the vacuum necessary to open a spring loaded poppet valve is sometimes sufficient to distort or otherwise damage the pressure container particularly when the vacuum relief valve is composed of rubber or other resilient valve material and becomes adhered to its seat under operating pressure and the influence of its controlling spring.

The object of the present invention is to provide for use in apparatus of the class described, a means of relieving vacuum which is more sensitive and positive in operation and which may be easily applied to a flow control and pressure relieving valvular device operated by a diaphragm.

Other objects of the invention reside in the novel combination and arrangement of parts and in the details of construction hereinafter illustrated and/or described in the drawings, in which:

Figure 1 is a cross sectional view of a valvular device embodying the principal features of the invention and shows the vacuum relief valve in its open position.

Figure 2 is a plan view of Figure 1 with part of the diaphragm cover member broken away to show a section of the diaphragm and the diaphragm pressure supporting plate.

Figure 3 is an enlarged view of a part of Figure 1 and shows the vacuum relief valve in its closed position.

Figure 4 is a cross sectional view taken on lines A-A of Figure 1.

Figure 5 is a perspective view of the valve connecting frame seen in Figure 1 and Figure 4.

As seen in Figure 1 there is a valve casing 2 having a screw threaded pressure inlet 3 communicating with a passageway 4 extending at right angles to terminate at a valve seat 5 through which pressure passes into the casing 2 for delivery through a screw threaded pressure delivery outlet 6. Pressure passing through the bore of the valve seat 5 is controlled by a flow control valve 7 supported in a recessed valve guide member 8 which is slidingly accommodated in the bore of a screw threaded closing cap 9. Screw threaded at one end to the valve guide member 8 is a valve connecting frame 10 the opposite end of which is screw threaded to removably accommodate a pressure relieving valve 11 seating against one side of a diaphragm 12 which spans the flanged bore of the casing 2 to which it is clamped by a corresponding flanged cover member 13. Both the pressure inlet controlling valve 7 and the pressure relieving valve 11 are closed together or independently against their seats, when operating, by a helical spring 14. Formed in the diaphragm 12 and controlled by the pressure relieving valve 11 is a pressure discharge port communicating with a corresponding centrally located opening 15 in a diaphragm pressure supporting plate 16 having a shank which is slidingly guided through a spring pressure stopping member 17 which, in turn, is screw threaded into the bore of the spring dome formed in the cover member 13. A helical diaphragm controlling spring 18 is disposed between a spring pressure plate 19 and a spring cap 20 and is adjustable by means of a screw 21. The screw 21 may be provided with a sealing cap to prevent any discharge presssure leakage past its screw thread.

Accommodated in a circular recess or port formed in the diaphragm pressure supporting plate 16 about midway between its central opening 15 and its perimeter is a vacuum relief valve 22, of smaller diameter than the recess diameter, which is removably attached by means of a screw 23 to a bridged member 24 spanning the recess.

As best seen in Figure 3 the vacuum relief valve 22 is formed to provide a stem 25 of smaller diameter than that of a vacuum relief port 26 formed in the diaphragm 12 through which it extends to slidingly accommodate a cupped washer 27 which is pressed against the diaphragm 12 to seal the valve 22 by a helical spring 28 having a dished retaining washer 29 secured by a pin 30 which is removable from its location hole in the valve stem 25 when the retaining washer 29 is compressed against the spring 28. The washer 27 is provided with perforations 31 around its cupped section to provide passageway for the relief of the vacuum.

As seen in Figure 4 the cover member 13 is formed to provide a pressure discharge and vacuum relief passageway 32 which directs pressure relieved through the valve 11 to a screw threaded outlet 33 formed integrally with the valve casing 2. Thus, pressure leakage through the vacuum relief valve 22 and/or the pressure relief valve 11 is directed to a common outlet opening which serves additionally as an inlet passageway for the relief of a vacuum or partial vacuum in the apparatus.

In operation, pressure of air, water or the like supplied to the inlet 3 passes through the passageway 4 and the valve seat 5 into the valve casing 2 for delivery through the outlet 6 to apparatus being pressure controlled.

When the pressure in the casing 2 has been built up against the diaphragm 12 sufficiently to counteract the pressure of the spring 18 the diaphragm and the supporting plate 16 move against the said spring and at the same time the spring 14 bearing against the guide member 8 and the connecting frame 10 presses the valve 11 against its seat and moves the connecting frame 10 with the diaphragm 12 until the flow control valve 7 reaches its seat 5 which closes the passageway 4 thus preventing pressure increase in the casing 2 and further movement of the diaphragm 12.

Any excess of this pressure in the casing 2, which may be caused by leakage of the flow control valve 7 or otherwise, causes the diaphragm 12 and the supporting plate 16 to move further against the spring 18 and away from the valve 11 thus allowing the excess pressure to be discharged through the diaphragm pressure discharge port the corresponding pressure plate opening 15 and the passageway 32 to the threaded outlet 33.

If, for any reason whatsoever, a vacuum or partial vacuum should be caused in the valve casing 2 the suction effect of the vacuum causes the diaphragm 12 to distort and move from the face of the pressure supporting plate 16 and consequently from the vacuum relief valve 22 thus opening the diaphragm port 26 so that the vacuum is immediately relieved therethrough.

More particularly, the influence of the spring 14 against the excess pressure relief valve 11 holds the central section of the diaphragm surrounding the pressure discharge port against the supporting plate 16 so that the suction effect of the vacuum distorts the annular portion of the diaphragm between its working perimeter and the seating rim of the valve 11.

The helical spring 28 is compressed as the diaphragm 12 moves from the vacuum relief valve 22.

When the vacuum has been relieved the influence of the spring 28 against the cupped washer 27 returns the diaphragm 12 to the valve 22 to firmly close the vacuum relief port 26.

Thus the invention provides a simple, sensitive and positive means of relieving vacuum in the class of apparatus described and makes better use of the diaphragm already used to automatically actuate the pressure controlling valves.

Having now fully described and ascertained my said invention and the manner in which it is to be performed, I declare that what I claim is:

1. Vacuum control apparatus of the class described comprising a valve casing, a pressure inlet passageway in the casing, a flow control valve adapted to control the inlet passageway for the purpose of reducing the pressure of air, water or the like delivered thereto, a diaphragm in the valve casing subjected to the fluid pressure in the valve casing and adapted to move in one sense under the influence of said pressure, an opening in the diaphragm, a pressure relief valve co-acting with the opening in the diaphragm and movable with the flow control valve, spring means adapted to maintain the flow control valve open as long as the fluid pressure in the valve casing does not exceed a certain value, a pressure supporting plate disposed on the opposite side of the diaphragm to that subjected to said pressure and through which the spring means acts upon the diaphragm, and a normally closed vacuum relief valve mounted on the pressure supporting plate, deformation of the diaphragm consequent upon the pressure in the casing exceeding the said certain value allowing the flow control valve to close whereupon the pressure relief valve is unable to move further and further increase in pressure in the valve casing causes the said opening in the diaphragm to be uncovered, and the vacuum relief valve being arranged in relation to the diaphragm whereby a vacuum or reduction of pressure in the valve casing following the cessation of supply of fluid to the valve casing causes the diaphragm to distort in the sense opposite to the said one sense and move away from the pressure supporting plate and the vacuum relief valve, thereby allowing air to enter the valve casing through the vacuum relief valve.

2. Vacuum control apparatus of the class described comprising a valve casing, a pressure inlet passageway in the casing, a flow control valve adapted to control the inlet passageway for the purpose of reducing the pressure of air, water or the like delivered thereto, a diaphragm in the valve casing subjected to the fluid pressure in the valve casing and adapted to move in one sense under the influence of said pressure, two openings in the diaphragm, a pressure relief valve co-acting with one of the openings in the diaphragm and movable with the flow control valve, a vacuum relief valve normally closing the other opening in the diaphragm, spring means adapted to maintain the flow control valve open as long as the fluid pressure in the valve casing does not exceed a certain value, a pressure supporting plate through which the said spring means acts upon the diaphragm, the pressure supporting plate being disposed on the opposite side of the diaphragm to the pressure relief valve, deformation of the diaphragm consequent upon the pressure in the casing exceeding the said certain value allowing the flow control valve to close whereupon the pressure relief valve is unable to move further and further increase in pressure in the valve casing causes the said one opening in the diaphragm to be uncovered, and the vacuum relief valve being arranged in relation to the diaphragm whereby a vacuum or reduction of pressure in the valve casing following the cessation of supply of fluid to the valve casing causes the diaphragm to distort in the sense opposite to the said one sense and move away from the pressure supporting plate and the vacuum relief valve, thereby allowing air to enter the valve casing through the vacuum relief valve.

3. Vacuum control apparatus as claimed in claim 2, in which the said one opening in the diaphragm is located centrally in relation to the pressure supporting plate and the vacuum relief valve is mounted between the center and the periphery of the pressure supporting plate.

4. Vacuum control apparatus as claimed in claim 2, and further including a cover member co-acting with the valve casing to clamp the diaphragm in position, a port in the diaphragm in communication with the interior of the cover member and an externally communicating outlet passageway in the valve casing in communication with the said port whereby fluid passing through the said one opening in the diaphragm into the cover member may be vented from the apparatus and air may pass into the interior of the cover member to pass through said vacuum relief valve into the valve casing when the vacuum relief valve is open.

5. Vacuum control apparatus as claimed in claim 1, and in which the vacuum relief valve seats directly against the diaphragm.

6. Vacuum control apparatus as claimed in claim 2, and in which the pressure relief valve and the vacuum relief valve both seat directly against the diaphragm.

References Cited in the file of this patent

UNITED STATES PATENTS

| | | |
|---|---|---|
| 2,189,084 | Schanck | Feb. 6, 1940 |
| 2,270,468 | Osborn | Jan. 20, 1942 |
| 2,739,611 | Cornelius | Mar. 27, 1956 |

FOREIGN PATENTS

| | | |
|---|---|---|
| 518,643 | France | Jan. 7, 1921 |